March 24, 1964

S. ROSOFF 3,126,199

DOCUMENT FEEDING APPARATUS

Filed Oct. 5, 1960

INVENTOR.
STANLEY ROSOFF
BY
William W. Jolton Jr.
ATTORNEY

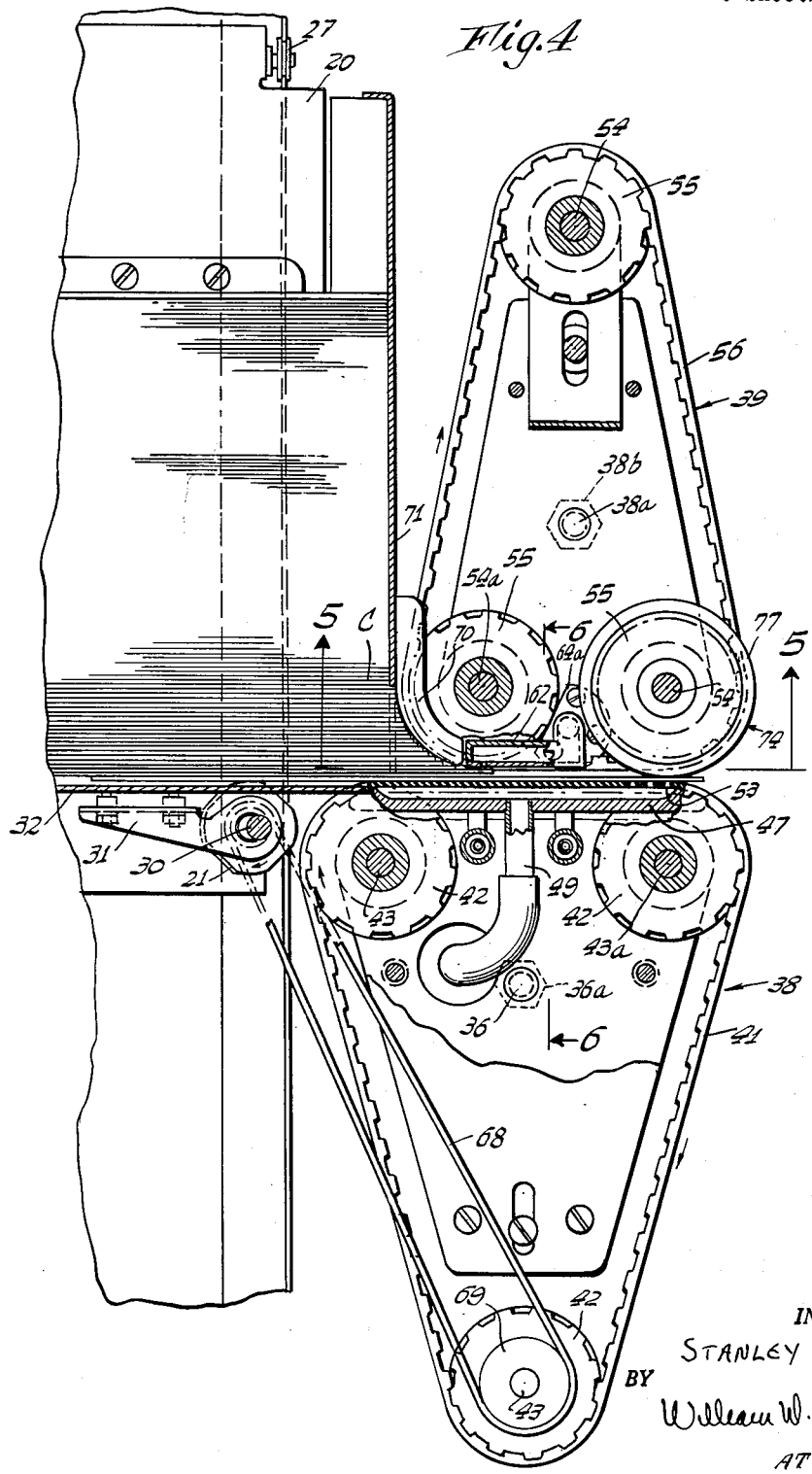

March 24, 1964   S. ROSOFF   3,126,199
DOCUMENT FEEDING APPARATUS
Filed Oct. 5, 1960   3 Sheets-Sheet 3
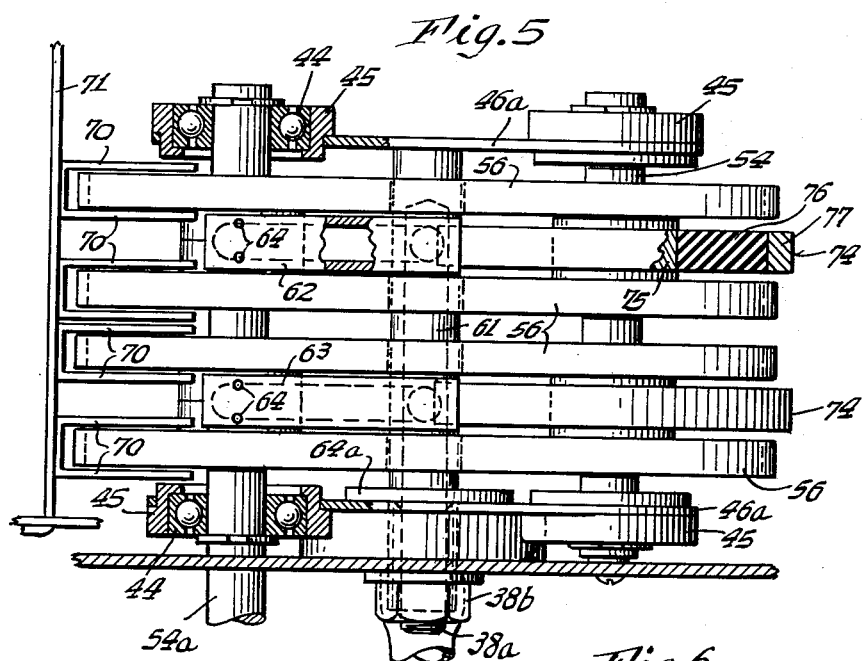
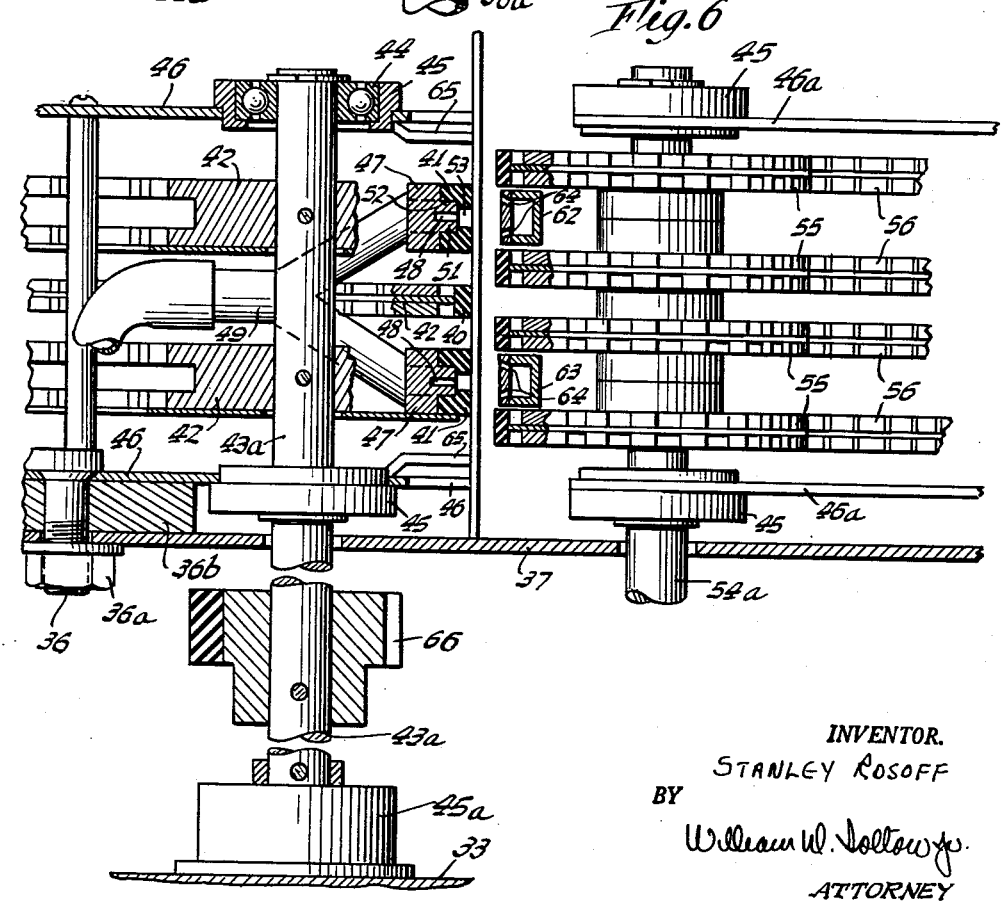
INVENTOR.
STANLEY ROSOFF
BY William W. Sollow Jr.
ATTORNEY

United States Patent Office 3,126,199
Patented Mar. 24, 1964

3,126,199
DOCUMENT FEEDING APPARATUS
Stanley Rosoff, Bridgeport, Conn., assignor to Pitney-Bowes, Inc., Stamford, Conn., a corporation of Delaware
Filed Oct. 5, 1960, Ser. No. 60,623
3 Claims. (Cl. 271—12)

This invention relates to an apparatus for feeding documents such as sheets, cards, checks, etc., and more particularly, to an apparatus for rapidly feeding such documents in one-by-one succession from a stack.

This invention represents an improvement over that set forth in copending U.S. Patent application Serial No. 602,191, filed August 6, 1956, to W. J. Hanson et al., now Patent No. 2,977,114. The document feeding apparatus disclosed in said copending application includes a document advancing means comprising a set of side-by-side endless advancing belts. Each of these advancing belts provides an endless friction surface engageable with the foremost document of a stack of documents as these advancing belts are driven about a closed path. A plurality of apertures provided by each one of two of these advancing belts periodically communicates with a vacuum shoe and with the foremost document of the stack whereupon that document becomes forcefully attached to the friction surfaces of these two driven advancing belts and is forwardly fed in contact with these belts. To prevent more than a single document from being fed at one time, a set of endless, side-by-side, reversely driven belts are provided at the opposite side of the document feed path from the advancing belts. The endless friction surfaces of the reverse belts are aligned and alternated with those of the advancing belts. The coefficient of friction between a document and the friction surfaces of the reversely driven belts is greater than that between a document and the friction surfaces of the advancing belts with the result that no documents will be fed until the foremost document of the stack becomes forcefully attached to the advancing belts whereupon only a single document will be advanced.

Since the friction surfaces of the two sets of belts are aligned with each other, and interference relation results when a document is forwardly fed between the two sets of belts. It is this interference relation that is responsible for the total normal force between the document and the reversely driven belts and for a portion of the total normal force between that document and the advancing belts. It will be apparent, then, that when a single document is being fed, a frictional drag effect will be exerted on that document by the reversely driven belts. Also, when a second document inadvertently enters between the two sets of belts along with the foremost document of the stack, not only is a frictional drag effect exerted by the second document on the foremost document which acts in the direction opposite to movement of the advancing belts, but this same frictional drag effect is, of course, exerted by the foremost document against said second document in the direction opposite to movement of the reversely driven belts. Although a high degree of reliability and efficiency is achieved with this arrangement, the friction surfaces of the two sets of belts tend to wear comparatively rapidly because of these frictional drag effects.

By virtue of the present invention, wear of these friction surfaces is substantially reduced along with other advantages. According to the embodiment of the invention as particularly disclosed herein, the friction surfaces of the reversely driven belts are spaced away from those of the advancing belts a distance greater than twice the thickness of a single document to provide a gap between the two sets of belts equal to this distance. The normal force by which a singly fed document is urged against the friction surfaces of the advancing belts is achieved by the vacuum shoe in cooperation with the apertures in the advancing belts. The normal force by which a second document inadvertently fed in overlapping relation with a respective foremost document, is urged against the reversely driven belts is achieved by additional vacuum means associated with the reversely driven belts. By providing a gap between the two sets of belts greater than the combined thickness of two of the documents being fed, the normal force (and therefore the frictional force) between a foremost document being fed from a stack and the friction surfaces of the advancing belts is independent of the normal force (and therefore the frictional force) between a second overlapping document and the friction surfaces of the reversely driven belts. Furthermore, and among other advantages, the frictional drag effect of the foremost document being fed and a second overlapping document on each other is substantially reduced if not eliminated altogether.

Accordingly, an object of the present invention is the provision of a new and improved apparatus for the feeding of documents of mixed sizes and thicknesses.

A further object of this invention is the provision of such an apparatus having improved wear characteristics.

Another object of the invention is to provide such an apparatus which demonstrates an improved reliability in feeding documents particularly when these documents are relatively permeable to air.

Still another object of the invention is the provision of such an apparatus that is well adapted to the feeding of carbon-backed documents.

Further objects and adavntages will become apparent as the description proceeds.

An embodiment of the invention is shown in the accompanying drawings wherein:

FIG. 4 is a plan view on an enlarged scale of a portion of the document feeding device as shown in FIG. 1, certain of the parts being broken away for purposes of illustration;

FIG. 5 is an elevational view taken in section along line 5—5 in FIG. 4; and

FIG. 6 is an elevational view taken in section along line 6—6 in FIG. 4.

Figure 1:
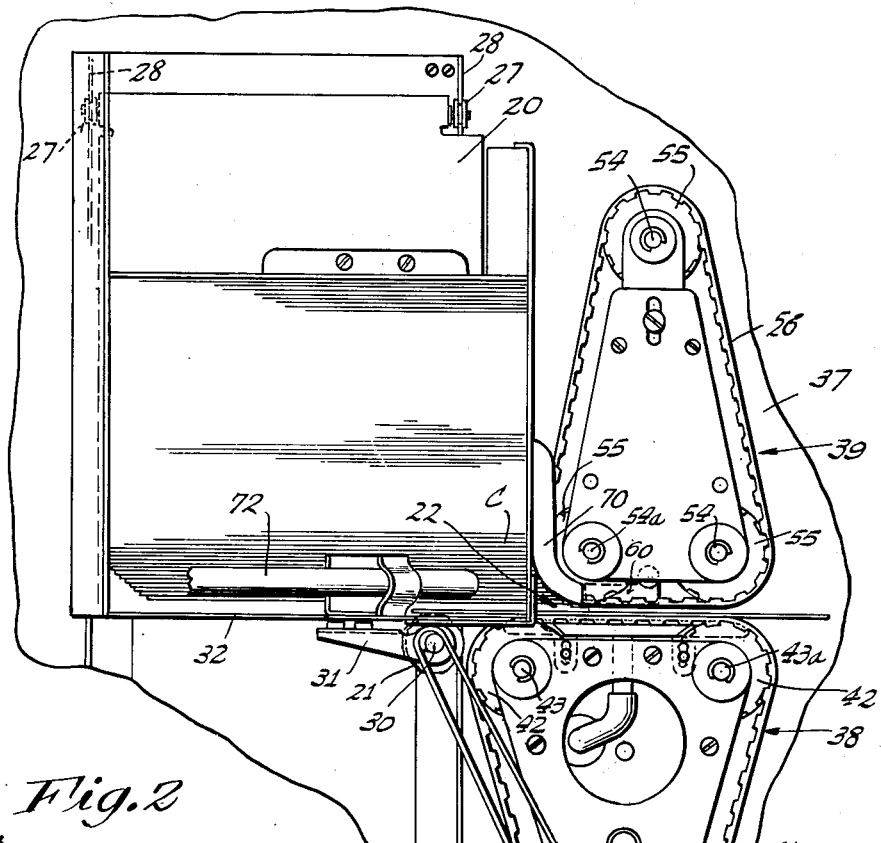
FIG. 1 is a plan view of a document feeding apparatus embodying the present invention.

Referring to the drawings in detail, and more particularly to FIGS. 1 and 4, the document feeding apparatus includes a movable document-supporting platform 20 on which documents such as checks C are stacked in vertical position on one of their longer edges. The document-supporting platform 20 is provided with rollers 27 which ride on tracks 28 for movement of the platform in the direction of an agitator feed wheel 21 under the yieldable bias of suitable conventional means such as a weight and pulley arrangement (not shown). The agitator feed wheel 21 has a plurality of flat sides as shown in FIGS. 1 and 4, and is continuously rotated in a clockwise direction about an angularly disposed axis to effect both endwise and downward urging of the foremost check of the stack. The agitator feed wheel 21 is mounted on a shaft 30 carried by a bracket 31, the bracket being attached to a vertical upright 32 forming part of the frame of the apparatus.

The frame of the document feeding apparatus generally comprises a platform 33 which suitably supports a check guide deck 37 as shown in FIGS. 5 and 6. The upper surface of the check guide deck 37 is aligned with the upper surface of the check-supporting platform 20. The downward urging of the agitator feed wheel 21 maintains the respective foremost check of the stack in registration with its lower edge against the platform 20 and guide deck 37. The endwise urging of the agitator feed wheel 21 forwardly advances the foremost check of the stack to an initial check feeding position generally indicated at 22 in FIG. 1.

The document feeding apparatus is operable successively to advance the respective foremost check of the stack by means of an advancing belt set generally indicated at 38 and to prevent a second check from advancing along with each respective foremost check by means of a reverse feed belt set generally indicated at 39. In this manner, the successive foremost checks are separated from the remaining checks of the stack and are forwardly advanced in one-by-one succession at a rate upwards of 750 checks per minute.

As shown in FIG. 6, the set of advancing feed belts comprises a center belt 40 along with upper and lower, mutually identical belts 41, 41. All three of the advancing feed belts 40, 41 and 41 are horizontally disposed and vertically spaced from each other. Each of the advancing belts is supported by pulleys 42, these pulleys being supported on shafts 43, 43 and 43a and arranged in a triangular order such that two of the shafts 43 and 43a and associated pulleys form the base while the other shaft 43 and associated pulleys thereon form the apex of the triangle. The belts are of the timing belt variety which have toothed inner surfaces adapted to mesh with toothed portions of their associated pulleys. The reach of the belts passing over the pulleys at the base of the triangular arrangement have their outer surfaces in vertical alignment and in the plane of the foremost check of the stack.

The pulley shafts 43, 43 and 43a are supported in ball bearings 44 within mountings 45 carried by upper and lower supporting plates 46 to provide free running shafts. The shaft 43a extends through the deck 37 and is supported within a ball bearing mounting 45a carried by the platform 33. See FIG. 6. The entire set of advancing feed belts is adapted to pivot about the shaft 43a to provide an adjustment relative to the set of reverse feed belts for the entrance of the checks between these two sets of belts. When properly adjusted the entire unit is adapted to be clamped in position against the deck 37 by a stud 36 and nut 36a, FIG. 6. The stud 36 passes from the lower plate 46 through a collar 36b.

As best seen in FIG. 6, the upper and lower advancing belts 41, 41 are wider than the center advancing belt 40. Said upper and lower belts are arranged with a vacuum shoe 47 positioned within the length of the reach of these belts at the check feeding location in a manner best shown in FIG. 4. Said shoe is provided with a vacuum port 48 extending substantially the reach of each of the advancing belts 41 and has a connection with a suitable vacuum supply by means of a connecting unit 49. Said vacuum shoe has a reduced fin portion 51 which fits within a groove 52 provided by cutting through the central portion of the teeth of each of the belts 41. See FIG. 6. Further, each of the belts 41 is perforated to provide at least one opening 53 but may include more than one perforation if desired. In practice it has been found convenient to use two groups of three perforations each, with each group spaced an equal distance from the other and the distance between the groups being greater than the longest check contemplated to be fed. Of course, each group of perforations 53 in the upper advancing belt 41 is vertically aligned with a group of perforations 53 in the lower advancing belt.

Hence, when the leading end of the foremost check of the stack has moved into engagement with the surface of the advancing belts 40, 41, 41 and a group of openings 53 in each of the advancing belts 41, 41 come opposite the leading surface of the check, the check will become forcefully attached to the surface of the belts 41, 41 opposite the openings and the check will move with the belts 40, 41, 41 until the openings pass beyond the end of the vacuum shoe 47. The vacuum shoe therefore, in cooperation with the openings in the advancing belts 41, acts in the capacity of a valving element to apply a negative pressure when the belt opening or openings reach the vacuum shoe and to shut off said negative pressure when the openings pass beyond said vacuum shoe.

Cooperating with the advancing feed belts is the reverse feed belt set 39. Said reverse feed belt set is arranged in a triangular order similar to that of the advancing feed belts and comprises pulleys 55 supported by three shafts 54, 54 and 54a; two of which 54, 54a form the base of the triangle, with the third forming the apex of the triangle. Said pulleys are positioned one above the other in four tiers as shown in FIGS. 5 and 6 and are arranged to support belts 56 at positions opposite the spaces between the advancing feed belts 40, 41, 41. Supporting means similar to that for the advancing belt set includes upper and lower supporting plates 46a—46a and ball bearing mountings 45 for the pulley shafts 54, 54 and 54a. The shaft 54a extends through the deck 37 and is supported within a ball bearing mounting carried by the platform 33 in a manner similar to that by which shaft 43a is supported. Shaft 54a provides a pivot for the entire set of reverse belts 56. Clamping of the set of reverse belts in adjusted position about the shaft 54a is effected by a stud 38a and nut 38b in a manner similar to that by which the advancing belt set 38 is clamped. The supporting plates 46, 46, 46a and 46a cooperate with a pair of auxiliary guide members 65, 65 as shown in FIG. 6 to aid in guiding each successively fed check along the check feed path.

A gear 66 (FIG. 6) fixed on shaft 43a is continuously driven by a conventional motor and transmission (not shown) to drive the shaft 43a and the advancing belts 40, 41, 41 in the clockwise direction as viewed in FIGS. 1 and 4. Shaft 54a is continuously driven by similar conventional means (not shown) to drive this shaft and the reverse belts 56 in the clockwise direction. As a result, the respective reaches of the advancing belts 40, 41, 41 at one side of the check feed path move forwardly (to the right as viewed in FIGS. 1 and 4) and the respective reaches of the reverse belts 56 at the other side of the check feed path move rearwardly (to the left as viewed in FIGS. 1 and 4). An endless belt 68 is driven by a pulley wheel 69 fixed on one of the shafts 43 as shown in FIG. 4, and this belt 68 drives a pulley wheel fixed to the agitator feed wheel 21. In this manner, the agitator feed wheel 21 is continuously driven in the clockwise direction.

With the stack of checks being urged in the direction to move the foremost check of the stack against the agitator feed wheel 21, the latter urges the foremost check downwardly and in the forward direction. Those checks immediately in back of the foremost check are also urged forwardly due to the frictional force applied from one check to the next. As a result, a number of the checks in back of the foremost check move into engagement with a set of curved guide plates 70 (see FIGS. 1 and 5) which terminate short of the plane in which the outer surfaces of the reverse belts adjacent the check feed path lie. The guide plates 70 are provided in pairs bridged at one end for securing the same to a support plate 71. In this manner, the checks engaged with the guide plates 70 are prevented from entering the gap between the two sets of belts.

To aid in separating the foremost check from the remaining checks of the stack, an overhead riffler 72 may be provided as shown in FIG. 1. The riffler 72 comprises a hollow conduit having an open end directed downwardly at the front end of the stack of checks. The other end of the conduit is connected to a suitable source of air under pressure.

The outer peripheral surface of each of the advancing belts 40, 41, 41 and each of the reverse belts 56 provides a coefficient of friction between that surface and the surface of the documents being fed, greater than that between the surfaces of two of the documents to be fed.

Figure 2:
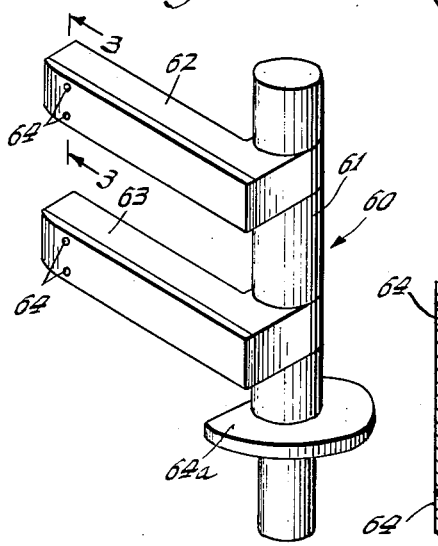
FIG. 2 is a perspetcive view on an enlarged scale of a vacuum shoe associated with the reversely driven belts of the document feeding apparatus.
Figure 3:
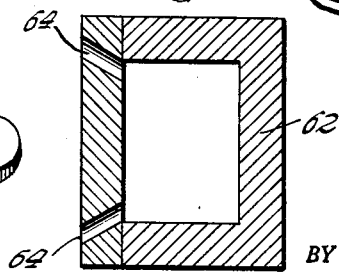
FIG. 3 is an elevational view taken in section along the line 3—3 in FIG. 2.

By adjusting the advance belt set 38 about shaft 43a and the reverse belt set 39 about shaft 54a, the friction surfaces of the belts of these two sets are positioned to provide a gap therebetween greater than twice the thickness of the documents being fed. This is in contradistinction to the interference relation between the friction surfaces of the belts of the two sets as provided by the feeding apparatus particularly described in said copending patent application. With the provision of said gap, the total normal force by which each successive foremost check is urged against the advancing belts 40, 41, 41 is achieved by the vacuum shoe 47 in cooperation with the apertures 53 in the advancing belts 41, 41. The total normal force, by which any second document moving along with the respective foremost document is urged against the reverse belts 51, is achieved by a vacuum shoe generally designated at 60. Vacuum shoe 60, shown in perspective in FIG. 2, comprises a vertically extending conduit 61 closed at its upper end. Communicating with the hollow interior of conduit 61 are the hollow interiors of two legs 62 and 63, respectively. Each of legs 62 and 63 provides a pair of apertures or ports 64, 64 which extend from an outer face of the respective leg to the hollow interior thereof. The lower end of conduit 61 is connected to a suitable vacuum source (not shown) whereby a negative pressure is maintained within the hollow interior of the vacuum shoe 60 and inwardly of the two pairs of apertures 64, 64. As best shown in FIGS. 5 and 6, vacuum shoe 60 is secured by an integral collar 64a to the plate 46a to dispose leg 62 between the two uppermost reverse belts 56 and leg 63 between the two lowermost reverse belts 56. The face of each of the legs 62 and 63 from which apertures 64 extend, is disposed in opposing relation to the outer surface of one of the advancing belts 41 and at a slightly greater distance in the direction away from the advancing belts than that at which the outer surfaces of the reverse belts 56 are disposed.

In operation, the foremost check of the stack becomes forcefully attached to the friction surface of the advancing belts 41, 41 when a set of apertures 53 in these advancing belts moves into communication with the leading end portion of the foremost check and with the hollow interior of the vacuum shoe 47 through the ports 48, 48. As the advancing belts move in the clockwise direction as viewed in FIGS. 1 and 4, the foremost check moves forwardly along the check feed path between the two sets of belts. A singly fed check or at least the leading end portion thereof, will exert no frictional drag effect on the reverse belts 56 because the friction surfaces of the latter are spaced from the friction surfaces of the advancing belts a distance greater than twice the thickness of the checks being fed. Also, no frictional drag effect will be exerted on the friction surfaces of either one of the two sets of belts when a second check enters between the two sets of belts along with a respective foremost check. This is the case because the atmospheric pressure prevailing between the two checks urges the second check toward the apertures 64 of the vacuum shoe 60 and away from the foremost check. Being urged toward the apertures 64, the second check will move into frictional engagement with the friction surfaces of the reverse belts 56 and will be driven in the reverse direction. A gap of approximately four times the check thickness is found to yield the best results with many varieties of check stock although this figure may decrease to slightly greater than two or increase substantially. By way of example, a gap of approximately twenty times the thickness of very thin stock has proved satisfactory.

A unique feature of the vacuum means associated with the reverse belts is that, unlike the vacuum means associated with the advancing belts, the former vacuum means is continuously effective rather than being effective only when a set of apertures in the respective belts communicates with the hollow interior of a vacuum shoe.

It will be noted that the normal force (and therefore the frictional force for a given set of reverse belts) between the reverse belts 56 and any second document that starts to be fed along with a respective foremost document, can be adjusted only by altering or adjusting the degree of interference between the two sets of belts of the document feeding device as disclosed in the above-cited copending application. Any adjustment, then, of the degree of this interference will also correspondingly alter the normal force (and therefore the frictional force) between the respective foremost document being fed and the advancing belts 40, 41, 41. However, with the provision of a gap greater than twice the thickness of the documents along with the provision of the vacuum means associated with the reverse belts as disclosed herein, the normal and frictional forces between the second document and the reverse belts can be adjusted independently of the normal and frictional forces between the respective foremost document and the advancing belts. This can be done by merely adjusting the magnitude of the negative pressure within the vacuum shoe 60.

The interference relation between the friction surfaces of the advancing and reverse belts as disclosed in the above-cited copending application leads to a concentration of wear at the corners of these belts defined by the intersection of the frictional surface with the upper and lower surfaces of each of the belts. This is the case because the documents being fed are flexible and the major amount of wear occurs at the points or lines of interference between the respective belts. By eliminating this interference relation and providing a gap between the belts along with the additional vacuum means, these lines or points of wear concentration are avoided. Consequently, not only is the amount of wear substantially reduced by the present invention, but, in addition, the wear that does occur is more evenly distributed over the friction surfaces of the belts. It follows that the advancing and reverse belts have a longer useful life, and less adjusting of the feeding apparatus is required to accommodate the wear that does occur.

It will be apparent that the greater the permeability to air of the documents being fed, the greater will be the problem of "bleed-through" of air through the document. That is, when a document is forcefully attached to the advancing belts by virtue of the vacuum means associated with these advancing belts, there is a tendency for air to bleed through the document. With the interference relation between the two sets of belts and no vacuum means associated with the reverse belt set, a second document that starts to be fed with a respective foremost document tends to become forcefully attached to the latter, making the problem of reversing the second document more difficult. By providing the gap between the two sets of belts and by providing vacuum means associated with the reverse belts, the ill effects of "bleed-through" are counteracted particularly where, as is disclosed herein, the reverse vacuum means is located directly opposite the advancing vacuum means. In this regard, the atmospheric pressure prevailing between the foremost and second documents and the reduced pressure at the outer side of each of these documents causes each one of these documents to move toward the next adjacent belts so that "bleed-through" of air through the documents does not cause the second document to tend toward forceful attachment to the foremost document.

As will be noted in FIG. 5, the apertures provided by the vacuum shoe 60 on the reversing side of the check feed path, are disposed at a location approximately at the entryway between the two sets of belts. As a result, the zone of influence of the reverse belts 56 in effecting reverse movement of any additional check that enters between the two sets of belts, is at this location whereby very limited forward movement of such an additional check past this location occurs. This leads to comparatively accurate registration of each successive foremost check before feeding thereof begins. It follows that friction surfaced reverse rollers can be substituted for the reverse belts 56 and pulleys 55. Alternatively, the pulleys on the shaft 54 adjacent the check feed path can be eliminated so that the reverse belts 56 would be entrained about the pulley wheels on the shaft 54a and the shaft 54 remote from the check feed path.

A pair of idler rollers 74, 74 may be provided as best shown in FIG. 5 for the purpose of continuing the application of a forward feeding force on each respective check being forwardly fed after each group of apertures 53 in the advancing belts 41, 41 move past the reach of the advancing belts at the check feed path. These idler rollers are of conventional construction and each includes an inner metal bearing ring 75 disposed for free rotation about the shaft 54. Each bearing ring 75 supports an annular ring 76 formed of resilient material such as rubber, and each ring 76 in turn supports an outer annular metal ring 77. The radially outer surfaces of rollers 74, 74 are disposed in engagement with or close proximity to the friction surfaces of the advancing belts 41, 41 at a location where these advancing belts are backed-up by the pulleys 42, 42 on the shaft 43a. By virtue of the resilient rings 76, the radially outer surfaces of the idler rollers 74, 74 will resiliently bias each of the successively fed checks against the friction surfaces of the advancing belts 41, 41.

By doing away with the interference relation between the two sets of belts, another advantage is attained with the present invention in that carbon-backed documents can be fed without excessive marking from the carbon backing of a foremost document against the front face of a second document that enters between the two sets of belts along with the foremost document.

Dimensions of certain of the parts as shown in the accompanying drawing have been altered for purposes of clarity of illustration.

Since many changes could be made in the embodiment of the invention as particularly described and shown herein without departing from the scope of the invention, it is intended that this embodiment be considered as exemplary and that the invention not be limited except as warranted by the following claims.

What is claimed is:

1. An apparatus for feeding documents forwardly along a feed path in one-by-one succession from a stack; said apparatus comprising: an advancing member providing a first endless peripheral friction surface having a portion thereof disposed at a location to one side of and contiguous with said feed path; means operatively connected to drive said first endless peripheral surface of the advancing member about a closed path in the direction to move forwardly at said location; a reversely-acting member providing a second endless peripheral friction surface having a portion thereof disposed at a location to the opposite side of said feed path and spaced from said first-mentioned portion a distance greater than twice the thickness of the documents to be fed; means operatively connected to drive said second endless peripheral surface of said reversely-acting member about a closed path in the direction to move rearwardly at said location; means providing periodic forceful attachment of said first peripheral surface to the respective foremost document of the stack to advance the respective foremost document forwardly along said feed path in contact with said first peripheral surface; and continuously operable vacuum means providing a vacuum port exposed to and facing said feed path from said opposite side of the feed path at a distance from said first endless peripheral surface greater than said first-mentioned distance to urge, into frictional engagement with said second peripheral frictional surface, any document overlapping a respective document being forwardly advanced in contact with said first peripheral surface.

2. An apparatus for feeding documents forwardly along a feed path in one-by-one succession from a stack; advancing means providing a first endless peripheral friction surface having a portion thereof disposed at a location to one side of and contiguous with said feed path; means operatively connected to drive said first endless peripheral surface of the advancing means about a closed path in the direction to move forwardly at said first location; a first vacuum means providing a first vacuum port facing said feed path from said one side thereof; said advancing means providing an aperture extending from said first friction surface and communicable with said first vacuum port while moving forwardly at said first location to forwardly advance the foremost document of said stack in contact with said first friction surface; a reversely acting member providing a second endless peripheral friction surface having a portion thereof disposed at a second location to the opposite side of said feed path; said second friction surface at said second location being spaced from said first friction surface at said first location a distance greater than twice the thickness of the documents to be fed; means operatively connected to drive said second endless peripheral surface about a closed path in the direction to move rearwardly at said second location; and continuously operable second vacuum means providing a second vacuum port facing said first vacuum port from said opposite side of the feed path and exposed to said feed path to urge, into frictional engagement with the frictional surface of said reversely acting member at said second location, any document overlapping a respective document being forwardly advanced in contact with said first frictional surface.

3. An apparatus for feeding documents forwardly along a feed path in one-by-one succession from a stack; said apparatus comprising: a plurality of advancing belts; each of said advancing belts providing an endless peripheral friction surface; means operatively connected to drive said advancing belts about a closed path in the direction to move a reach of each of said belts forwardly at a first location to one side of and contiguous with said feed path; a first vacuum means providing a vacuum port for each of said advancing belts; each of said advancing belts providing an aperture extending from the friction surface thereof and communicable with one of said vacuum ports while moving forwardly along said reach at said location to forwardly advance the foremost document of said stack in contact with the friction surface thereof; reversely acting means providing an endless peripheral friction surface having a portion thereof disposed at a second location to the opposite side of said feed path; said portion of the friction surface of the reversely acting means at said second location being spaced from the friction surfaces of said advancing belts at said first location to provide a gap therebetween greater than twice the thickness of the documents to be fed; means operatively connected to drive the endless peripheral surface of said reversely acting member about a closed path in the direction to move rearwardly at said second location; and continuously operable second vacuum means providing a vacuum port opposing and facing each one of the vacuum ports of said first vacuum means from the opposite side of said feed path at a distance from the endless peripheral surfaces of said advancing belts greater than the size of said gap; the vacuum ports of said second vacuum means being exposed to said feed path to urge, into frictional engagement with the frictional surface of said reversely acting means at said second location, any document entering said gap along with a respective document being forwardly advanced in contact with the peripheral surfaces of said advancing belts.

References Cited in the file of this patent

UNITED STATES PATENTS

| | | |
|---|---|---|
| 1,040,025 | Schlesinger | Oct. 1, 1912 |
| 2,936,170 | Herrick et al. | May 10, 1960 |
| 3,067,998 | Cattorini et al. | Dec. 11, 1962 |